US011281763B2

(12) United States Patent
Sharma et al.

(10) Patent No.: US 11,281,763 B2
(45) Date of Patent: Mar. 22, 2022

(54) INTEGRATED DEVELOPMENT ENVIRONMENT INFORMATION SHARING FOR AUTHENTICATION PROVISIONING

(71) Applicant: Microsoft Technology Licensing, LLC, Redmond, WA (US)

(72) Inventors: Varun Sharma, Bellevue, WA (US); Christopher Richard Mann, Redmond, WA (US); Nicholas David Torkington, Redmond, WA (US); Krupa Tadepalli, Kirkland, WA (US); Yixin "Catherine" Wang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 545 days.

(21) Appl. No.: 16/189,027

(22) Filed: Nov. 13, 2018

(65) Prior Publication Data

US 2020/0151319 A1 May 14, 2020

(51) Int. Cl.
*G06F 21/44* (2013.01)
*H04L 29/06* (2006.01)
(Continued)

(52) U.S. Cl.
CPC .......... *G06F 21/44* (2013.01); *G06F 21/6218* (2013.01); *H04L 63/102* (2013.01); *H04W 12/084* (2021.01); *G06F 8/71* (2013.01)

(58) Field of Classification Search
CPC ........ G06F 21/44; G06F 21/6218; G06F 8/71; G06F 9/44505; G06F 8/30; H04W 12/084; H04L 63/102; H04L 63/08
See application file for complete search history.

(56) References Cited

U.S. PATENT DOCUMENTS 9,727,445 B2 * 8/2017 Simernitski ........... G06F 11/362
10,110,434 B2 * 10/2018 Cooper ................. H04L 41/082
(Continued)

OTHER PUBLICATIONS

"Azure-sdk-for-net/src/SdkCommon/AppAuthentication/Azure. Services.AppAuthentication/TokenProviders/VisualStudioAccessTokenProvider.cs", retrieved from <<https://github.com/Azure/azure-sdk-for-net/blob/psSdkJson6/src/SdkCommon/AppAuthentication/Azure.Services.AppAuthentication/TokenProviders/VisualStudioAccessTokenProvider.cs>>, May 22, 2018, 3 pages.
(Continued)

*Primary Examiner* — Michael R Vaughan
(74) *Attorney, Agent, or Firm* — Ogilve Law Firm

(57) ABSTRACT

Resource access credential security is improved by providing authentication tools and techniques which do not rely on embedment of credentials in the source code or configuration files of programs that use the credentials to access secured resources. A program under development in a development tool determines through the operation of authentication code that it is under development and that a developer identity is to be used to obtain access credentials, instead of using an identity of the program itself as occurs when the program is not under development. The development tool may be stand-alone, or may be in an integrated development environment, and may be extensible or not. The program may be an application, a web service, or other software, and may be deployed to a cloud or other networked environment. Authentication may be based on a selected developer identity or selected account or other subscriber data.

20 Claims, 6 Drawing Sheets

(51) Int. Cl.
   *G06F 21/62* (2013.01)
   *H04W 12/084* (2021.01)
   *G06F 8/71* (2018.01)

(56) References Cited

U.S. PATENT DOCUMENTS

| | | | | |
|---|---|---|---|---|
| 2004/0215672 | A1* | 10/2004 | Pfitzner | G06F 8/71 |
| 2014/0282398 | A1* | 9/2014 | Podolyak | G06F 8/36 |
| | | | | 717/121 |
| 2014/0282399 | A1* | 9/2014 | Gorelik | G06F 8/71 |
| | | | | 717/122 |
| 2015/0269605 | A1 | 9/2015 | Flood et al. | |
| 2016/0350783 | A1 | 12/2016 | Sharma et al. | |
| 2017/0161181 | A1* | 6/2017 | Koreki | G06F 11/3672 |
| 2017/0352086 | A1 | 12/2017 | Sharma et al. | |
| 2017/0374177 | A1* | 12/2017 | Chrysanthakopoulos | |
| | | | | G06F 9/541 |
| 2020/0127975 | A1* | 4/2020 | Burgess | H04L 63/101 |

OTHER PUBLICATIONS

"What is managed identities for Azure resources?", retrieved from <<https://docs.microsoft.com/en-us/azure/active-directory/managed-identities-azure-resources/overview>>, Oct. 22, 2018, 6 pages.

"Microsoft Azure Services AppAuthentication 1.0.3", retrieved from <<https://www.nuget.org/packages/Microsoft.Azure.Services.AppAuthentication/>>, no later than Nov. 3, 2018, 3 pages.

"Manage the resources associated with your Azure accounts in Visual Studio Cloud Explorer", retrieved from <<https://docs.microsoft.com/en-us/visualstudio/azure/vs-azure-tools-resources-managing-with-cloud-explorer?view=vs-2017>>, Mar. 24, 2017, 8 pages.

"Sign in to Visual Studio", retrieved from <<https://docs.microsoft.com/en-us/visualstudio/ide/signing-in-to-visual-studio?view=vs-2017>>, Nov. 15, 2017, 3 pages.

"What is Azure Stack?", retrieved from <<https://azure.microsoft.com/en-us/overview/azure-stack/>>, no later than Nov. 3, 2018, 8 pages.

"Key Vault", retrieved from <<https://azure.microsoft.com/en-us/services/key-vault/>>, no later than Nov. 3, 2018, 6 pages.

"Safe storage of app secrets in development in asp.net Core", retrieved from <<https://docs.microsoft.com/en-us/aspnet/core/security/app-secrets?tabs=windows&view=aspnetcore-2.1>>, Sep. 23, 2018, 11 pages.

"CawaMS/aspnetcore-msi-keyvault", retrieved from <<https://github.com/CawaMS/aspnetcore-msi-keyvault>>, Dec. 4, 2017, 5 pages.

"CawaMS/app-service-msi-keyvault-dotnet", retrieved from <<https://github.com/CawaMS/app-service-msi-keyvault-dotnet>>, Dec. 4, 2017, 5 pages.

"Continuous Delivery Tools for Visual Studio", retrieved from <<https://marketplace.visualstudio.com/items?itemName=VSIDEDevOpsMSFT.ContinuousDeliveryToolsforVisualStudio>>, no later than Nov. 3, 2018, 6 pages.

"Download Center", retrieved from <<https://www.microsoft.com/en-us/download/details.aspx?id=56115>>, no later than Nov. 3, 2018, 6 pages.

"Microsoft.Configuration.ConfigurationBuilders.Azure 1.0.0—preview", retrieved from <<https://www.nuget.org/packages/Microsoft.Configuration.ConfigurationBuilders.Azure/1.0.0-preview>>, no later than Nov. 3, 2018, 3 pages.

"How to use managed identities for App Service and Azure Functions", retrieved from <<https://docs.microsoft.com/en-us/azure/app-service/app-service-managed-service-identity>>, Jun. 24, 2018, 10 pages.

"Downloads", retrieved from <<https://visualstudio.microsoft.com/downloads/>>, no later than Nov. 3, 2018, 4 pages.

"Azure Services Authentication Extension", retrieved from <<https://marketplace.visualstudio.com/items?itemName=chrismann.MicrosoftVisualStudioAsalExtension>>, no later than Nov. 3, 2018, 2 pages.

"Managing Secrets Securely in the Cloud", retrieved from <<https://blogs.msdn.microsoft.com/visualstudio/2017/11/17/managing-secrets-securely-in-the-cloud/>>, Nov. 17, 2017, 9 pages.

"Development process for Azure", retrieved from <<https://docs.microsoft.com/en-us/dotnet/standard/modern-web-apps-azure-architecture/development-process-for-azure>>, Jun. 27, 2018, 6 pages.

"Tutorial: Use Azure Key Vault from a web application", retrieved from <<https://docs.microsoft.com/en-us/azure/key-vault/key-vault-use-from-web-application>>, Oct. 8, 2018, 9 pages.

"Service to service calls using client credentials (shared secret or cerlilicate)", retrieved from <<https://docs.microsoft.com/en-us/azure/active-directory/develop/v1-oauth2-client-creds-grant-flow>>, Feb. 7, 2017, 6 pages.

"What is Azure Active Directory?", retrieved from <<https://docs.microsoft.com/en-us/azure/active-directory/fundamentals/active-directory-whatis>>, Sep. 12, 2018, 5 pages.

"Keep credentials out of code: Introducing Azure AD Managed Service Identity", retrieved from <<https://azure.microsoft.com/en-us/blog/keep-credentials-out-of-code-introducing-azure-ad-managed-service-identity/>>, Sep. 14, 2017, 5 pages.

"Is Azure Function to Function authentication with MSI supported", retrieved from <<https://stackoverflow.com/questions/46567295/is-azure-function-to-function-authentication-with-msi-supported#>>, Oct. 4, 2017, 5 pages.

"Kerberos (protocol)", retrieved from <<https://en.wikipedia.org/wiki/Kerberos_(protocol)>>, Aug. 14, 2015, 7 pages.

Mark Walla, "Kerberos Explained", retrieved from <<https://msdn.microsoft.com/en-us/library/Bb742516.aspx>>, May 2000, 6 pages.

"RFC 1510—The Kerberos Network Authentication Service (V5)", retrieved from <<https://tools.ietf.org/html/rfc1510>>, Sep. 1993, 112 pages.

"RFC 4120—The Kerberos Network Authentication Service (V5)", retrieved from <<https://tools.ietf.org/html/rfc4120>>, Jul. 2005, 139 pages.

\* cited by examiner

INTEGRATED DEVELOPMENT ENVIRONMENT INFORMATION SHARING FOR AUTHENTICATION PROVISIONING

BACKGROUND

Software is created, tested, feature enhanced, corrected, performance optimized, and otherwise developed using development tools. Development tools take many forms, and have various characteristics. For example, some development tools are stand-alone programs, while other development tools are provided in a suite for coordinated usage, such as an integrated development environment. Some development tools are tailored to one or more particular programming languages while other tools, or at least portions thereof, are programming language agnostic, meaning they do not rely on or take advantage of features that are specific to a particular programming language. Some development tools are hosted in a cloud environment, or help develop cloud-hosted software, or both, while others do not. Some development tools have thousands of available extensions, each with its own features, limitations, and operational assumptions or options. Some development tools provide a graphical user interface, some provide a textual command line interface, and some provide both. Some development tools provide their full functionality without any security restrictions such as proof of a subscription or an identity authentication requirement, while other development tools place at least a portion of their functionality behind a security perimeter. The foregoing are merely some examples; other characteristics may also be present in varied combinations within particular development tools.

SUMMARY

As taught herein, some development tools are tailored to improve computing system security by permitting authentication of a program under development without requiring storage of authentication credentials inside the program's source code. Similarly, some embodiments taught herein support the authentication of a program that is under development, without requiring storage of authentication credentials inside the program's configuration files. Because source code and configuration files are sometimes kept in relatively insecure locations, storing authentication credentials inside them poses a security risk. But that has nonetheless been a common practice before now, because more secure yet convenient alternatives were not employed.

Some teachings presented herein were motivated by a technical challenge of efficiently providing authentication credentials to a program under development without embedding the credentials in the program's source or configuration files. A subordinate challenge was efficiently providing the authentication credentials in different environments. Specifically, efficiently providing the authentication credentials both when the program was under development and when the program ran in a production environment, and doing so without requiring a different program executable, e.g., a different binary, for the production environment than the executable that ran in the development environment. Other technical challenges addressed by the innovations taught here will also be apparent to one of skill from the discussion provided below.

Some embodiments presented herein include a processor, a memory in operable communication with the processor, a developer digital identity which has been authenticated, a development tool which is executable with the processor under the authenticated developer digital identity, and a software program under development. The software program includes a program authentication portion which upon execution retrieves a resource access credential usable by a software program under development. The retrieved resource access credential is: (i) usable by the software program to access a secured resource, (ii) based on the authenticated developer digital identity, and (iii) retrieved from a resource access credential source which is external to the following software program constituents: all source code of the software program, and all configuration files of the software program.

Some embodiments presented herein provide or utilize actions that are performed within an integrated development environment (IDE) which is itself, or which includes, a development tool. The actions help authenticate a software program for access to a secured resource. In some embodiments, the IDE receives a developer digital identity and a developer credential, and transmits representations of the developer digital identity and developer credential to an identity management directory for authentication. The IDE gets a verification from the identity management directory, which verifies that the developer digital identity is authenticated. Then the IDE obtains a resource access credential based on the authenticated developer digital identity. The IDE stores the resource access credential in a storage location to support later action by the software program which is under development in the IDE. The software program directly (itself) or indirectly (via other software) retrieves the resource access credential from the storage location, and requests access to the cloud-hosted secured resource based on the resource access credential. When all goes well, the software program gains authenticated access to the cloud-hosted secured resource, based on the resource access credential. Accordingly, the software program under development in the IDE gains proper access to the cloud-hosted secured resource without requiring storage of any secured resource access credentials in source code or configuration files of the software program.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
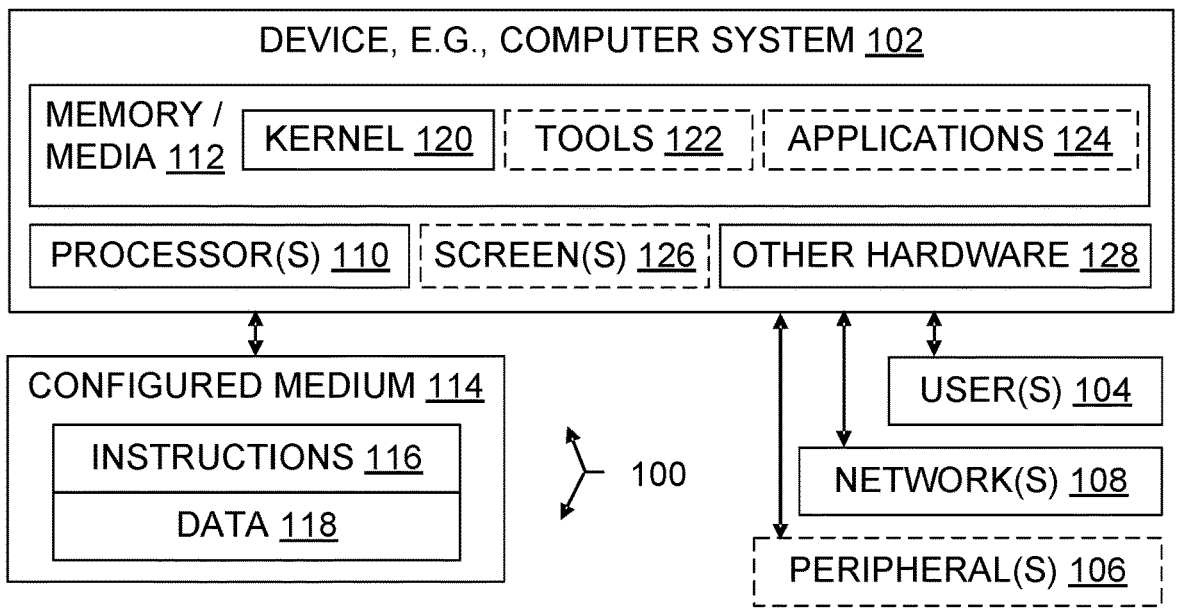
FIG. 1 is a block diagram illustrating a computer system generally and also illustrating a configured storage medium generally.

Many innovations expand beyond their origins, but understanding an innovation's origins can help one more fully appreciate the innovation. In the present case, innovations in computer security arose in the context of the inventors seeking ways to improve the security of software that is under development for deployment in an Azure® cloud using one or more software development tools referred in the industry generally as "Visual Studio" (registered mark of Microsoft Corporation). Microsoft provides various versions and editions of Visual Studio® software development tools (registered mark of Microsoft Corporation). These Visual Studio® tools and aspects of the Azure® cloud provide informative examples in this document. However, one of skill will acknowledge that the teachings provided herein are not all limited to environments containing Azure® or Visual Studio® solutions. Many of the teachings may also or alternatively be applied to enhance development work that employs other development tools, other cloud technology, or both.

One of the capabilities of many development tools is text editing. The text being edited is often computer program source code, which may be kept in a repository to facilitate collaboration between developers and to provide version control. Some of the most widely used web-based repositories, which provide services for source code and development project hosting, include GitHub® (mark of GitHub, Inc.), BitBucket® (mark of Atlassian Pty Ltd), and SourceForge® (mark of SourceForge Media, LLC). However, many other kinds of repository also exist, and many individual repositories and repository services may be created after the filing of the present disclosure.

As explained in more detail elsewhere herein, the credentials which are used to authenticate requests to access secured resources in Azure® clouds and other clouds have often been stored in source code, or in program configuration files. These source code and configuration files have in turn often been stored in repositories which are connected to the internet. When the repository access controls are misconfigured, or when the repository's security is breached, the credentials stored in the repository have been compromised.

Teachings presented herein provide an attractive alternative, which includes an integrated development environment (IDE) or other development tool sharing information for authentication provisioning. Instead of relying on credentials embedded in its own files, an application uses credentials obtained through the development tool using a developer's identity. This allows efficient development of services that call Azure® services (for example) without the need to store credentials in source files. This will reduce the risk of their compromise.

Software Development Life Cycle (SDLC)

Some embodiments share authentication information between an integrated development environment (IDE) and other running applications such as applications being debugged by the IDE. To provide context and further illustrate aspects of some embodiments, information is provided here about software development. This information includes specific development tools and methodologies, with the understanding that the teachings herein are not limited to these specifics.

More generally, one of skill will recognize that not every part of this disclosure, or any particular details therein, are necessarily required to satisfy legal criteria such as enablement, written description, or best mode. Also, embodiments are not limited to the particular programming languages, tool contexts, identifiers, fields, files, or other implementation choices described herein. Any apparent conflict with any other patent disclosure, even from the owner of the present innovations, has no role in interpreting the claims presented in this patent disclosure.

Developer adherence to an application development lifecycle (which is an example of a SDLC) has many benefits, but has also resulted in resource access credentials being stored in source repositories, as explained below. This example lifecycle starts from each developer's machine, with the developer coding the app using their preferred programming language and testing it locally on the development machine. Developers followed basic steps noted below when building an application to be hosted in a cloud, e.g., hosted in an Azure® App Service environment as a Web App (mark of Microsoft Corporation).

SDLC Step 1: Local Dev Environment Inner Loop.

Developing an application for deployment to an Azure® cloud is no different in many ways from developing an application for other deployments. Developers use a local development environment they are comfortable with, such as Visual Studio® 2017 tools, a dotnet CLI and Visual Studio® Code tools, or the developer's preferred standalone editor and tools. The developers write code, run and debug changes, run automated tests, and make local commits to source control until they are ready to push their changes to a shared source control repository.

SDLC Step 2: Application Code Repository.

Whenever they are ready to share their code with their team, the developers push the changes from their local source repository to their team's shared source repository.

SDLC Step 3: Build Server Functionality for Continuous Integration to Build and Test Packages.

A new build is triggered on a build server whenever a new commit is made to the shared application code repository. As part of the continuous integration (CI) process, this build will fully compile the application and run automated tests to confirm everything is working as expected. The normal desired result of the CI process is a packaged version of the web app, ready for deployment.

SDLC Step 4: Build Server Functionality for Continuous Delivery.

Once a build has succeeded, a continuous delivery (CD) process will pick up the build artifacts produced, including a web deploy package. The build server will deploy this package to Azure® App Service or another target environment, replacing any existing instances of the rebuilt service with the newly built version. Often this step targets a staging environment, but some applications deploy directly to production through a CD process.

SDLC Step 5: Hosted Executing Web App.

Once deployed, the application runs within the context of an Azure® App Service Web App or other hosting environment. An Azure® Web App can be monitored and further configured using Azure® Portal functionality.

In many cases, developers operating according to an SDLC use code samples from a vendor as a starting point or template to code their own solution. Since the sample code often show resource access credentials being written to or read from source code or configuration files, developers do the same in their own code, and under the SDLC they end up checking their resource access credentials into source repositories, often in plaintext form. As a result, these credentials get compromised as developers share the code with others.

A problem addressed by the present teachings is how to allow development of services that call Azure® services or other secured cloud resources without storing resource access credentials in source files. Applying the teachings herein reduces or eliminates this problem, thus reducing the risk of credentials being compromised.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by making those systems more secure. Specifically, some embodiments increase cybersecurity by storing credentials in a cloud-hosted vault or other tightly secured facility instead of keeping the credentials inside source code or in configuration files that are more exposed to the internet than the vault contents. Likewise, security is improved when credentials are not stored in human-readable form (e.g., ASCII or Unicode text) on a developer machine, where they may be displayed onscreen with other source code or configuration data and hence be subject to compromise through "shoulder surfing". Some developer machines also reside outside a strong enterprise security environment, e.g., when developers work on source code at home, or when they work for smaller companies that lack the security resources needed to provide multilayer up-to-date defense-in-depth. Other advantages based on the technical characteristics of the teachings will also be apparent to one of skill from the description provided.

Some embodiments described herein may be viewed by some people in a broader context. For instance, concepts such as authentication, credentials, identity, security, and storage, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently recommend tool extensions that tend to make development more productive. Other configured storage media, systems, and methods involving authentication, credentials, identity, security, or storage are outside the present scope. Accordingly, vagueness, mere abstractness, lack of technical character, and accompanying proof problems are also avoided under a proper understanding of the present disclosure.

Note Regarding Hyperlinks

This disclosure may contain various URIs, hyperlinks, IP addresses, and/or other items which might be considered browser-executable codes. These items are included in the disclosure for their own sake to help describe some embodiments, rather than being included to reference the contents of the web sites or files that they identify. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, and Names

Some acronyms, abbreviations, and names are defined below. Others are defined elsewhere herein, or do not require definition here in order to be understood by one of skill.

AD: Active Directory® solution or technology (mark of Microsoft Corporation)

ALU: arithmetic and logic unit

API: application program interface, a.k.a. application programming interface

App: application program

ASCII: American Standard Code for Information Interchange

BIOS: basic input/output system

CD: compact disc, or continuous delivery/deployment (depending on whether context indicates a data storage medium such as a compact disc or a software life cycle aspect such as continuous delivery or continuous deployment)

CI: continuous integration

CLI: command line interface, a.k.a. command line interpreter

CPU: central processing unit

DVD: digital versatile disk or digital video disc

FPGA: field-programmable gate array

FPU: floating point processing unit

GPU: graphical processing unit

GUI: graphical user interface

GUID: globally unique identifier

HTML: hypertext markup language

HTTP: hypertext transfer protocol

HTTPS: hypertext transfer protocol secure

IDE: integrated development environment, sometimes also called an "interactive development environment"

IP: internet protocol
Java: programming language
LAN: local area network
LDAP: lightweight directory access protocol
MSI: managed service identity
OAuth: open authorization standard (standard version in effect as of the present disclosure's priority date unless indicated otherwise)
OS: operating system
RAM: random access memory
ROM: read only memory
TCP/IP: transmission control protocol/internet protocol
UDP: user datagram protocol
URI: uniform resource identifier
URL: uniform resource locator (a kind of URI)
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" by itself and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, services, cloud infrastructure components, middleware, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private (e.g., on-premises), public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"Resource" means a data structure, database, web service, web page, web site, endpoint, level of access, URL-identified item, GUID-identified item, or other computing resource, networking resource, or storage resource.

"Access credential" means digital information used to access a resource, beyond the existence and location of the resource. Examples of access credentials include access tokens, digital certificates, username+password, or similar information.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as debugging a program, authenticating a digital identity, storing or retrieving a resource access credential, transmitting representations of identities and credentials, and requesting access to a secured resource are understood herein as inherently digital. A human mind cannot interface directly with a CPU or other processor, or with RAM or other digital storage, to read and write the necessary data to perform the authentication, provisioning, and information sharing steps taught herein. This would be well understood by persons of skill in the art in view of the present disclosure, but others may sometimes need to be informed or reminded of the facts. Unless stated otherwise, embodiments are also presumed to be capable of operating at scale (i.e., one thousand or more host machines or virtual machines) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, authenticating, avoiding, checking, communicating, completing, creating, debugging, determining, developing, diagnosing, displaying, editing, executing, extending, gaining, generating, getting, hosting, identifying, monitoring, obtaining, provisioning, receiving, requesting, requiring, retrieving, running, securing, selecting, sending, sharing, specifying, stepping, storing, transmitting, using, utilizing, verifying (and accesses, accessed, authenticates, authenticated, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; may be further characterized in some situations as a development environment or a production environment, for example 102 computer system, also referred to as computational system or computing system 104 users 106 peripherals 108 network generally 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, device drivers 122 tools, e.g., anti-virus software, firewalls, packet sniffer software, intrusion detection systems (IDS), intrusion prevention systems (IPS), software development tools and tool suites, hardware development tools and tool suites 124 applications, e.g., word processors, web browsers, spreadsheets, games, email tools, web apps 126 display screens, also referred to as "displays"

128 computing hardware not otherwise associated with a reference number 106, 108, 110, 112, 114

202 developer system 204 development tool; may also be referred to as "computing technology development tool", or "software development tool"

206 extension to a computing technology development tool; may also be referred to as a "plug-in" or "tool extension"; includes binary or other executable code; not to be confused with a filename extension such as ".doc" or ".pdf" or ".html"

208 software program 210 credentials generally 212 digital identity generally; also referred to as "digital ID" or in context as "identity" or "ID"; some examples include developer ID (a.k.a. "developer identity") and app ID 308

214 software repository; also referred to as "repository"; may hold computer program source code, object code, configuration files, resource files, dynamic link libraries, and other components of computing technology manifestations that are under development; also refers to repository identifier 216 computer program source code 218 computer program configuration file 220 data transfer between developer system and repository, e.g., pull or push to update repository or developer system 222 staging system, e.g., a system where code defects and deficiencies are identified by testing but source code changes are not made—instead, results are communicated to developers 224 production system, e.g., system which runs programs live and subject to input from the public or paid subscribers 226 communications between a development system and a reduced-development (testing but no source code changes) or non-development (production) system 228 representations of credentials or identities, e.g., hashes, or encodings; also includes the non-hashed non-encoded digital credentials or digital identities themselves (data may be a representation of itself); for this purpose, "encoding" includes base64, compression, encryption, serialization, and so on 230 verification from identity and access management service, e.g., Active Directory® service, that an identity has been authenticated as valid 232 resource access credential; this is an example of a credential 210

Figure 11:
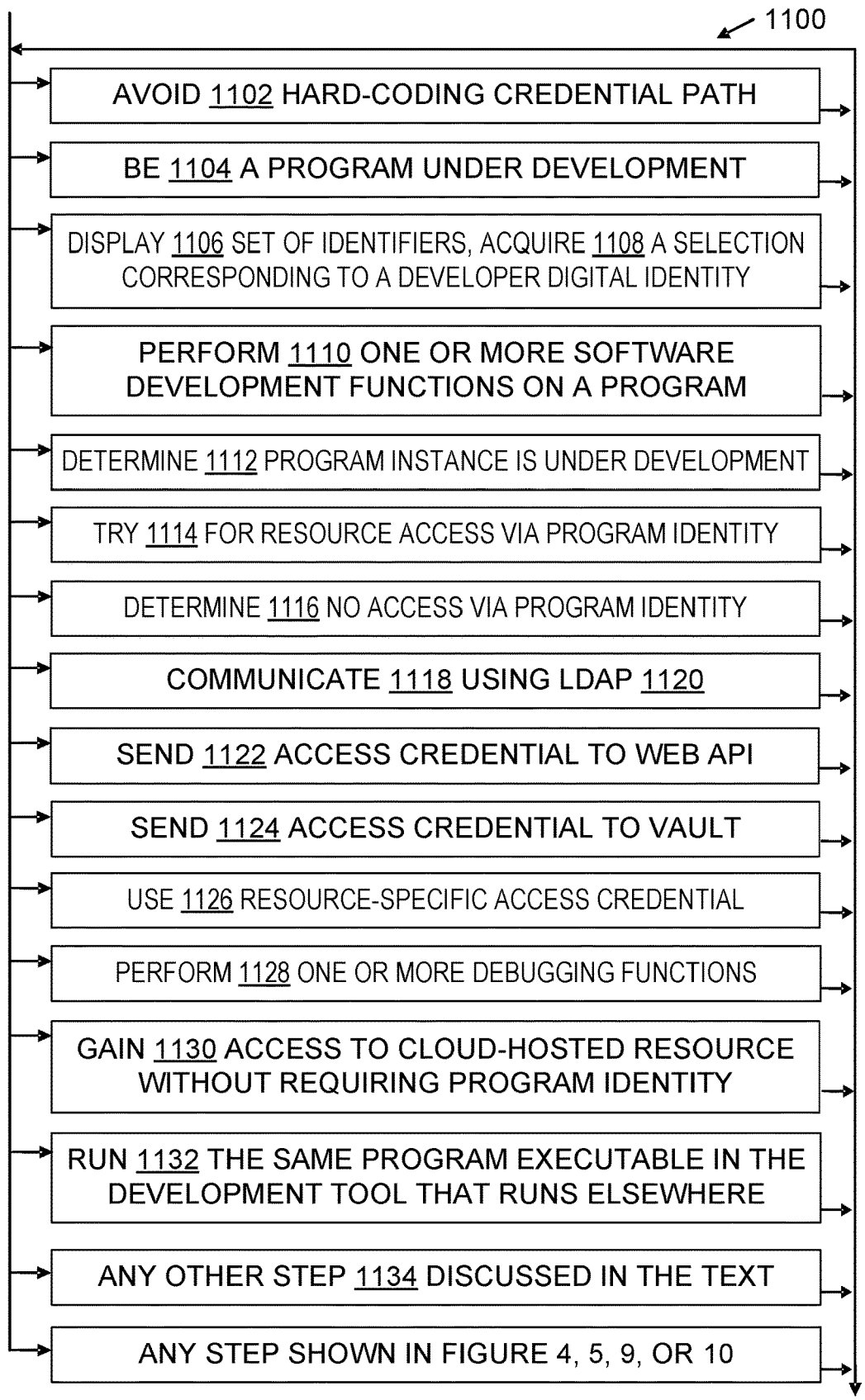
FIG. 11 is a flowchart further illustrating steps in some program authentication methods.

234 source of resource access credentials 236 directory, e.g., Active Directory® solution or another LDAP-compatible directory of user/application/entity/item identity information 238 service provided in a cloud or other networked environment 240 vault for securely containing hashes, keys, certificates, shared secrets, and the like 242 secured resource 244 API or other programmatic interface 246 cloud
302 program authentication portion
304 program environment detector
306 program environment, e.g., development system, staging system, or production system
308 program identity; also referred to as "program digital identity" or "program ID", or in the case of an application program as "application identity", "application ID", "app identity", or "app ID"; this is an example of a digital identity 212
310 middleware
312 cloud infrastructure component, e.g., management plane, deployment software, virtualization software, resource providers for compute/network/storage services
314 code not specifically associated with another reference numeral
502 integrated development environment
600 cloud subscriber data
602 cloud subscriber account
604 identifier generally
606 cloud tenant
608 cloud subscriber account identifier
610 cloud tenant identifier
612 identifier of an identity directory service
700 software development functions
702 debugging
704 performing diagnostic(s)
706 checking syntax
708 building executable(s)
710 deploying code, e.g., to a cloud
712 completing an identifier in source code, also referred to as auto-completion
714 editing text, e.g., source code or configuration file text
716 designing software using an automated or partially automated process
718 compiling code
720 monitoring program performance during execution
722 detecting one or more detects, e.g., during testing or debugging or static analysis or dynamic analysis
724 generating code (e.g., source, assembly, p-code, object, or binary code)
726 provisioning software with credentials, resources, or configuration information
728 profiling speed, memory usage, or other characteristics of a program during execution of the program
800 examples of small secrets which may be stored in a vault
802 cryptographic key
804 digital certificate
806 cryptographic hash
900 flowchart; also refers to method(s) illustrated by the flowchart
902 receive a developer digital identity
904 transmit representations of digital identity and credential
906 get verification of identity authentication
908 obtain a resource access credential
910 request access to a secured resource based on possession or control of a resource access credential
912 gain access to a secured resource based on a resource access credential
914 avoid relying on credential storage embedded in application
1000 flowchart; also refers to method(s) illustrated by the flowchart
1002 store a resource access credential in volatile or non-volatile storage but not in application source code or configuration file
1004 retrieve a stored resource access credential
1100 flowchart; also refers to method(s) illustrated by the flowchart
1102 avoid hard-coding a path (absolute or relative, filesystem path or URI) to a credential storage location; use, e.g., API calls or LDAP communications instead
1104 be under development, e.g., be directly subject to or undergoing one or more software development functions 700
1106 display a set of identifiers
1108 acquire a selection after displaying identifiers
1110 perform one or more software development functions 700
1112 determine that a program instance (e.g., an executing or suspended program) is under development, i.e., that the program is 1104 under development
1114 try (as a program) to access a secured resource using an identity specific to the program, as opposed to using a developer's identity
1116 determine that access to a resource using a program identity is not presently available, e.g., because there is no assigned program identity or because the program is under development, or both
1118 communicate with a directory using LDAP
1120 LDAP (lightweight directory access protocol); may be, e.g., consistent with the LDAP protocol according to most recent LDAP standard published as of this disclosure's priority date
1122 send an access credential to a web API, e.g., send 1124 an access token to a vault interface
1126 use a resource-specific access credential, as opposed to using an access credential to can be used to gain access to multiple diverse resources
1128 perform one or more debugging functions; may be referred to generally as "debug" or "debugging"
1130 gain proper access to a secured resource by showing possession or control of a particular access credential, and without specifying a program identity (e.g., by specifying a developer identity instead)
1132 run the same executable (e.g., binary) in a development environment (e.g., using a developer identity for authentication for access to secured resources) and in a production environment (e.g., using a program identity to access the same resources)
1134 any other step discussed herein but not specifically called out in FIG. 11

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, hardware developers, engineers, and end-users are each a particular type of user 104, although it is contemplated that most users will likely be software developers who are end-users of a software development tool. Automated agents, scripts, playback software, and the like acting on behalf of one or more people may also be users 104, e.g., to facilitate testing a system 102, but end-users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122, 502 which provides a developer with a set of coordinated computing technology development tools 122 such as compilers, source code editors, profilers, debuggers, layout tools, simulators, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment 128 can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific configurations, implementations, arrangements, displays, features, groupings, approaches, or scenarios provided herein. A given embodiment may include additional or different technical features, mechanisms, sequences, components, or data structures, for instance, and may otherwise depart from the examples provided herein.

Figure 2:
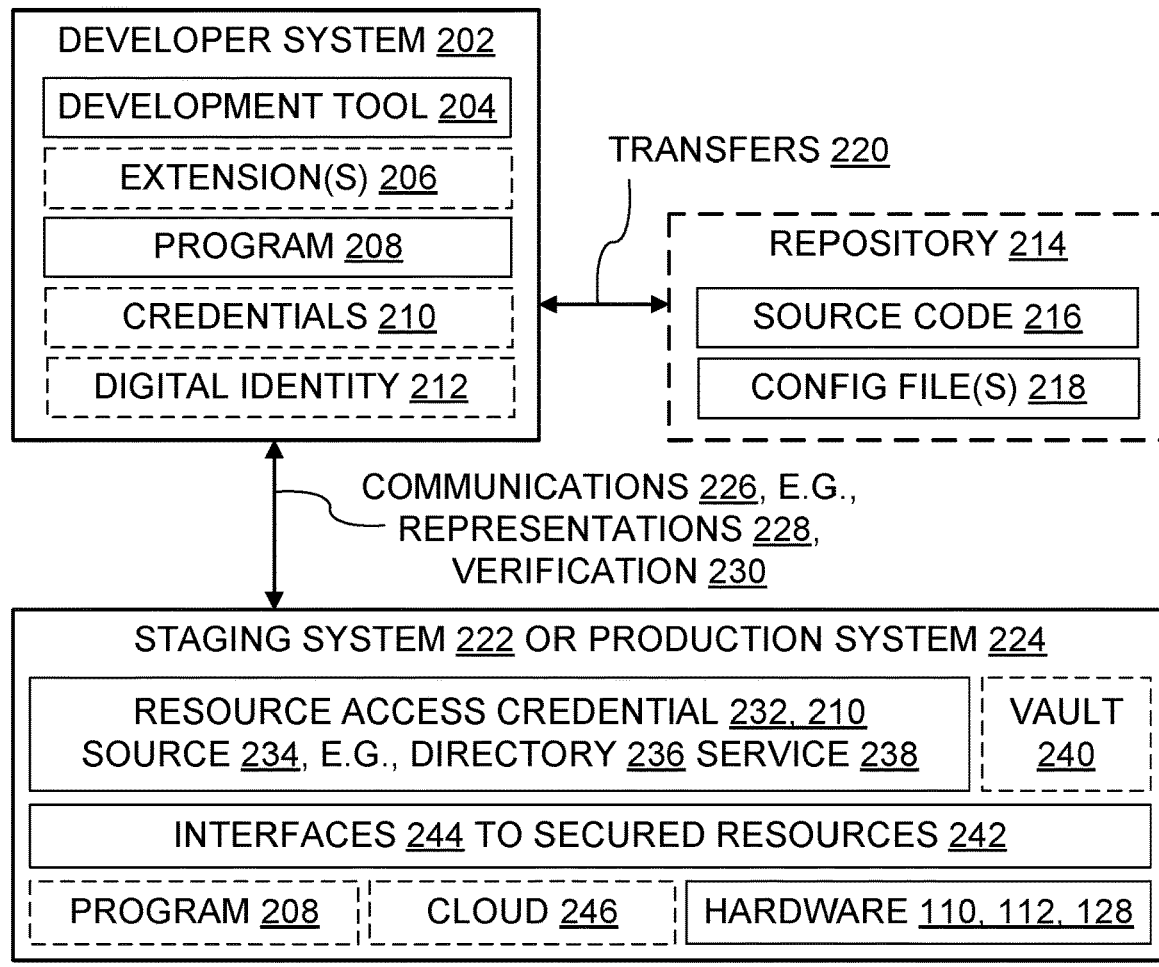
FIG. 2 is a block diagram illustrating aspects of a computing technology development environment which includes a developer system with a development tool, in conjunction with a repository holding source code and configuration files, and in conjunction with a reduced-development or non-development environment such as a staging system or a production system.

FIG. 2 illustrates aspects of some security architectures suitable for embodiments taught herein. A developer system 202 includes a development tool 204, which may be a stand-alone tool or an IDE, and may be extensible through extensions 206, or not be extensible. A program 208 is under development on the illustrated developer system. The illustrated program has one or more source code 216 and configuration files 218, which may be stored in a repository 214 in addition to residing on the developer system. As indicated by the dashed lines, some environments which can benefit from the teachings herein include or communicate 220 with a repository, while others do not. Also, although the configuration file 218 is shown in FIG. 2 using solid lines, one of skill will recognize that some programs 208 do not have configuration files. Security of a program 208 and the credentials it uses can be improved by removing the credentials 210 from embedment in the program, regardless of whether the program has a configuration file. This removal from embedment can be accomplished by using the developer's digital identity 212 to obtain resource access credentials 210 as taught herein, instead of embedding the credentials 210 in the program.

The example shown in FIG. 2 also includes a staging system 222 or a production system 224, or both. These systems 222, 224 include one or more secured resources 242, which the program under development would access in order to perform as designed. Access to the secured resources in this example is gained by submitting resource access credentials 232, 210 to the resource interface 244. The resource access credentials 232, 210 are obtained by the developer system from a source 234 such as an identity management directory 236, through direct LDAP communications 226 or by way of a service 238, or both, for example. The example shown also includes a vault 240, which may be accessed using one credential 232 in order to obtain another credential 210, which will be used in turn to access some other resource 242. As indicated, the systems 222, 224 may each be, or reside in, or include, or communicate with, a cloud 246. However, not every embodiment involves a cloud. Teachings herein can be used, e.g., to increase cybersecurity in embodiments that include a non-cloud internal network which has authorization and authentication servers.

Figure 3:
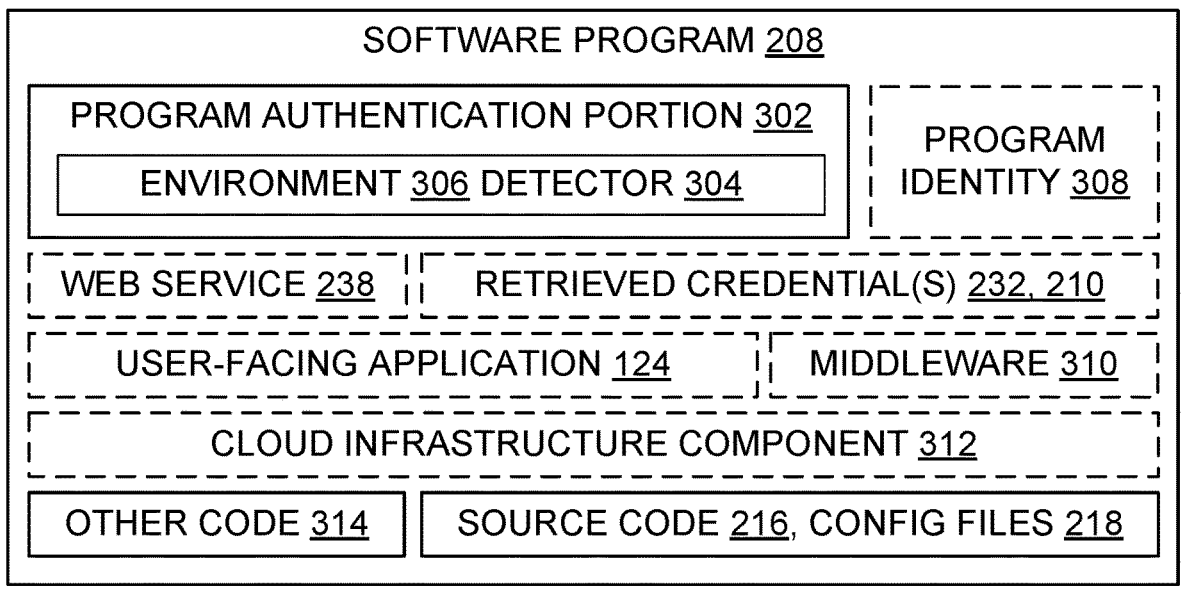
FIG. 3 is a block diagram illustrating aspects of a software program.

FIG. 3 illustrates aspects of a program 208. The program 208 may be, or reside in, or include, a web service 238, middleware 310, an application 124 such as a web app, or a cloud infrastructure component 312. The program may have an identity 308, which is managed by an identity directory 236. Azure® Active Directory® solutions are examples of identity directories 236, but other identity directories 236 may also be employed. The illustrated program includes a program authentication portion 302, which is a library, routine, or other portion of code used for authentication based on a developer identity as taught herein, when the program 208 is under development. A library known by the name Microsoft.Azure.Services.AppAuthentication and its invocation in a program form an example of a program authentication's portion 302, but other libraries or code may also function as taught herein for program authentication using a developer identity. The program authentication portion 302 in some embodiments also uses the program identity 308 for authentication when the program 208 is not under development, e.g., when the program is running on a production system 224.

Figure 4:
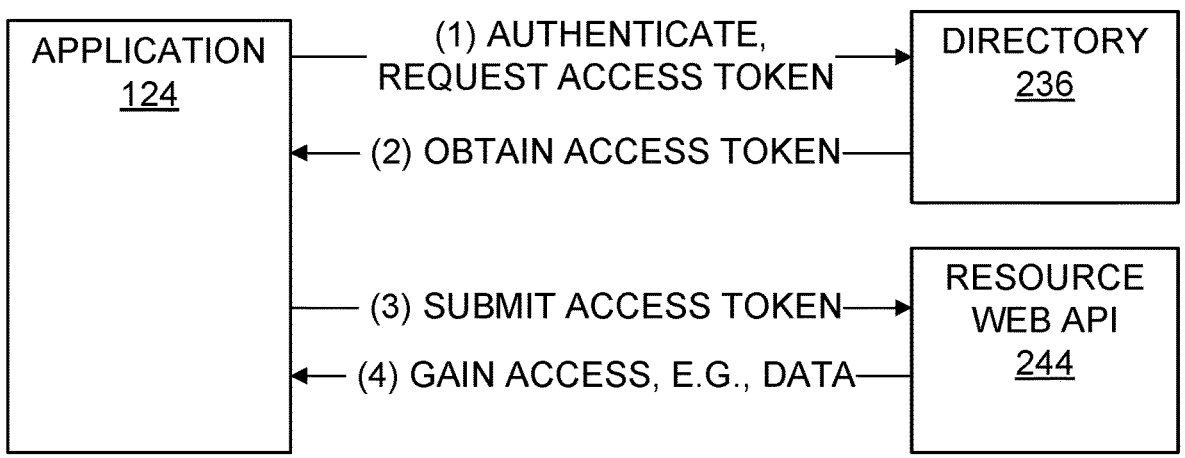
FIG. 4 is a flow diagram illustrating aspects of application authentication in a production environment using an identity management directory.

FIG. 4 illustrates aspects of application authentication in a production environment using an Azure® Active Directory® solution ("Azure AD") from Microsoft as an identity management directory 236. Azure AD is a multi-tenant, cloud-based directory, including an identity management service, which combines core directory services, application access management, and identity protection into a single solution. Azure AD also offers a rich, standards-based platform that enables developers to deliver access control to their applications, based on centralized policy and rules. Azure AD supports service-to-service authentication using OAuth 2.0 Client Credentials flow. The OAuth 2.0 Client Credentials Grant Flow permits a web service (a confidential client) to use its own credentials instead of impersonating a user, to authenticate when calling another web service. In this scenario, the client is typically a middle-tier web service, a daemon service, or a web site.

FIG. 4 shows how a client credentials grant flow works in Azure AD in a production environment, and in similarly equipped environments. As indicated at arrow (1), a client application 124 authenticates to the Azure AD (directory 236) token issuance endpoint and requests an access token (an access token is an example of a credential 210). As indicated at arrow (2), in this example the Azure AD token issuance endpoint issues the access token 210. As indicated at arrow (3), the access token is used to authenticate to the secured resource, at resource API 244. As indicated at arrow (4), data from the secured resource is returned to the client application 124. In some implementations consistent with FIG. 4, the client application uses a credential to authenticate to Azure AD. This credential can be a shared secret or a certificate, for example. Some existing tutorials include code samples which indicate that the credential is stored in configuration files with the source code. In particular, one tutorial for using Azure® Key Vault from a web application indicates that the secret 210 is to be stored in the client application's configuration file.

Figure 5:
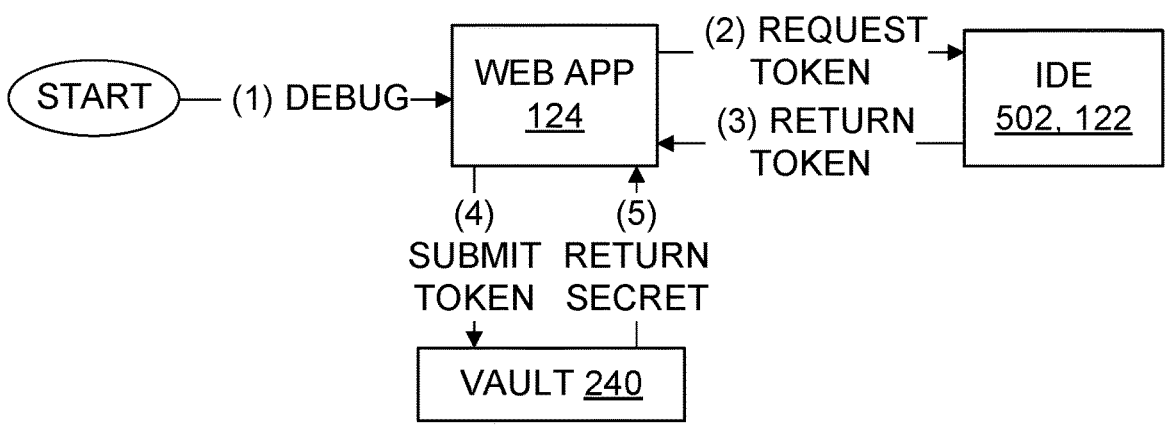
FIG. 5 is a flow diagram illustrating aspects of application authentication in a development environment using a vault which holds cryptographic keys, digital certificates, or other small-sized secrets.
Figure 8:
FIG. 8 is a block diagram illustrating some examples of small secrets which may be contained in a vault.

FIGS. 5 and 8 illustrate aspects of application authentication in a development environment using a vault 240. The vault holds content 800 such as cryptographic keys 802, digital certificates 804, or other small-sized secrets, e.g., hashes 806. As indicated at arrow (1) in FIG. 5, a user starts debugging an application in an IDE 502. In some Visual Studio® IDEs, for example, application debugging may be started by pressing the F5 key. As indicated at arrow (2), the application being debugged requests an access token. This may be occur, e.g., when an application uses the Microsoft.Azure.Services.AppAuthentication library, which uses an Azure® Services Authentication extension 206 of the IDE to request an access token. As indicated at arrow (3), the IDE (e.g., the Azure® Services Authentication extension 206 in this case) returns an access token (a.k.a., "authentication token") to the web app 124. As indicated at arrow (4), the application 124 uses the authentication token to access the vault 240 (Azure® Key Vault in this case). As indicated at arrow (5), the vault 240 returns the requested secret value to the web app 124, allowing the web app to continue running successfully.

Figure 6:
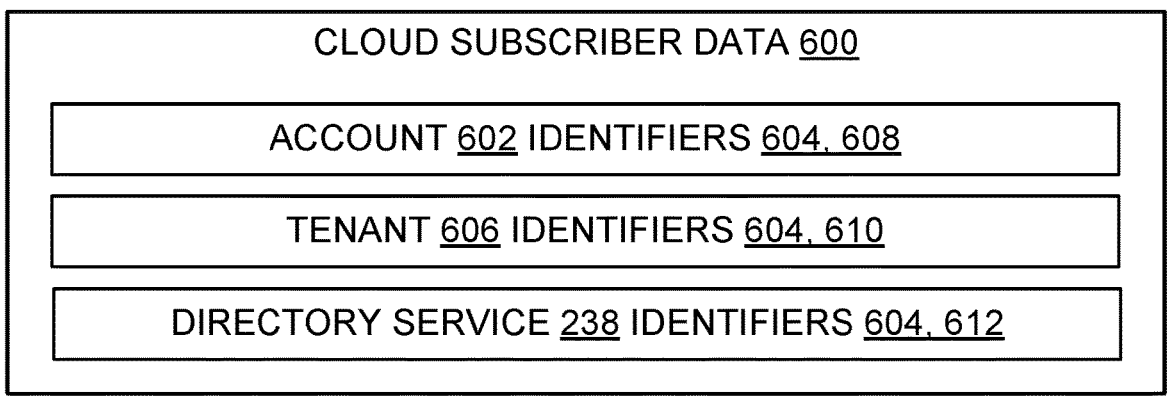
FIG. 6 is a block diagram illustrating aspects of some cloud subscriber data.

FIG. 6 illustrates aspects of some cloud subscriber data. A cloud subscriber has one or more subscription accounts 602, with respective account identifiers 608. Except in private clouds that have only one tenant, the cloud subscriber is a tenant 606 in a multi-tenant cloud, with a tenant identifier 610. In some environments, multiple identity management directories 236 and directory services 238 are available, so the subscriber data 600 may include an identification 612 of a particular directory or particular directory service. A directory service identifier implicitly or explicitly identifies a directory which corresponds to the service.

Figure 7:
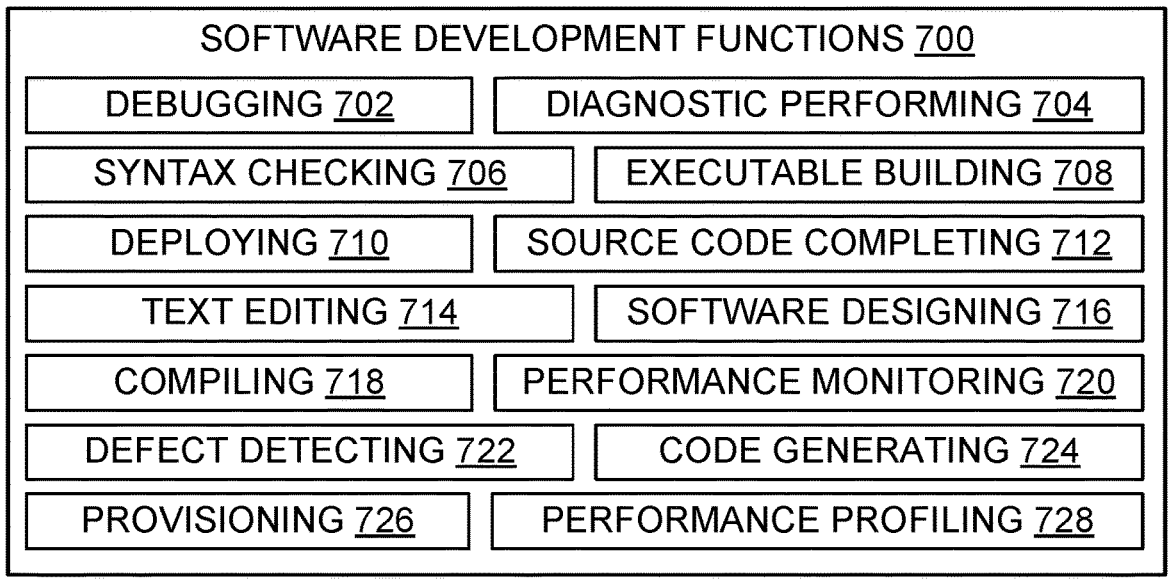
FIG. 7 is a block diagram illustrating some software development functions.

FIG. 7 illustrates aspects of some software development functions 700, including debugging 702, performing 704 diagnostics, checking 706 source code or configuration file syntax, building 708 executables, deploying 710 executables, completing 712 identifiers during editing, editing 714, designing 716, compiling 718, monitoring 720 performance, detecting 722 defects, generating 724 code, provisioning 726, and profiling 728.

Some embodiments use or provide a software development system 202 configured for authenticating a software program 208 for access to a secured resource 242. The system includes a processor 110, a memory 112 in operable communication with the processor, a developer digital identity 212 which has been authenticated, and a development tool 204 which is executable with the processor under the authenticated developer digital identity. The software program 208, which is executable with the processor under control or scrutiny by the development tool 204, includes a program authentication portion 302 which upon execution with the processor retrieves a resource access credential 232. The credential 232 is usable by the software program to access the secured resource, is based on the authenticated developer digital identity, and is retrieved from a resource access credential source 234 which is external to the following software program constituents: all source code 216 of the software program, all configuration files 218 of the software program.

In some embodiments, the development tool 204 includes an integrated development environment 502.

In some embodiments, the development tool 204 is extensible by at least one pluggable tool extension 206.

In some embodiments, the software program 208 includes at least one of the following: a user-facing application 124, middleware 310, a web service 238, a cloud infrastructure component 312, or an application 124 which has a version deployed in a cloud 246.

In some embodiments, all source code 216 of the software program 208 and all configuration files 218 of the software program 208 are each free of any currently effective resource access credential 210 and are each also free of any hard-coded path which identifies a storage location which contains a currently effective resource access credential 210.

Some embodiments include the software development system 202 in combination with the secured resource 242.

Some embodiments include the software development system 202 in combination with the resource access credential source 234. The source 234 may be an identity management director 236 or service 238 thereof, or a vault 240, for example.

Other system embodiments are also described herein, either directly or derivable as system versions of described methods or configured media, informed by the extension discussion herein of computing hardware.

Methods

Figure 9:
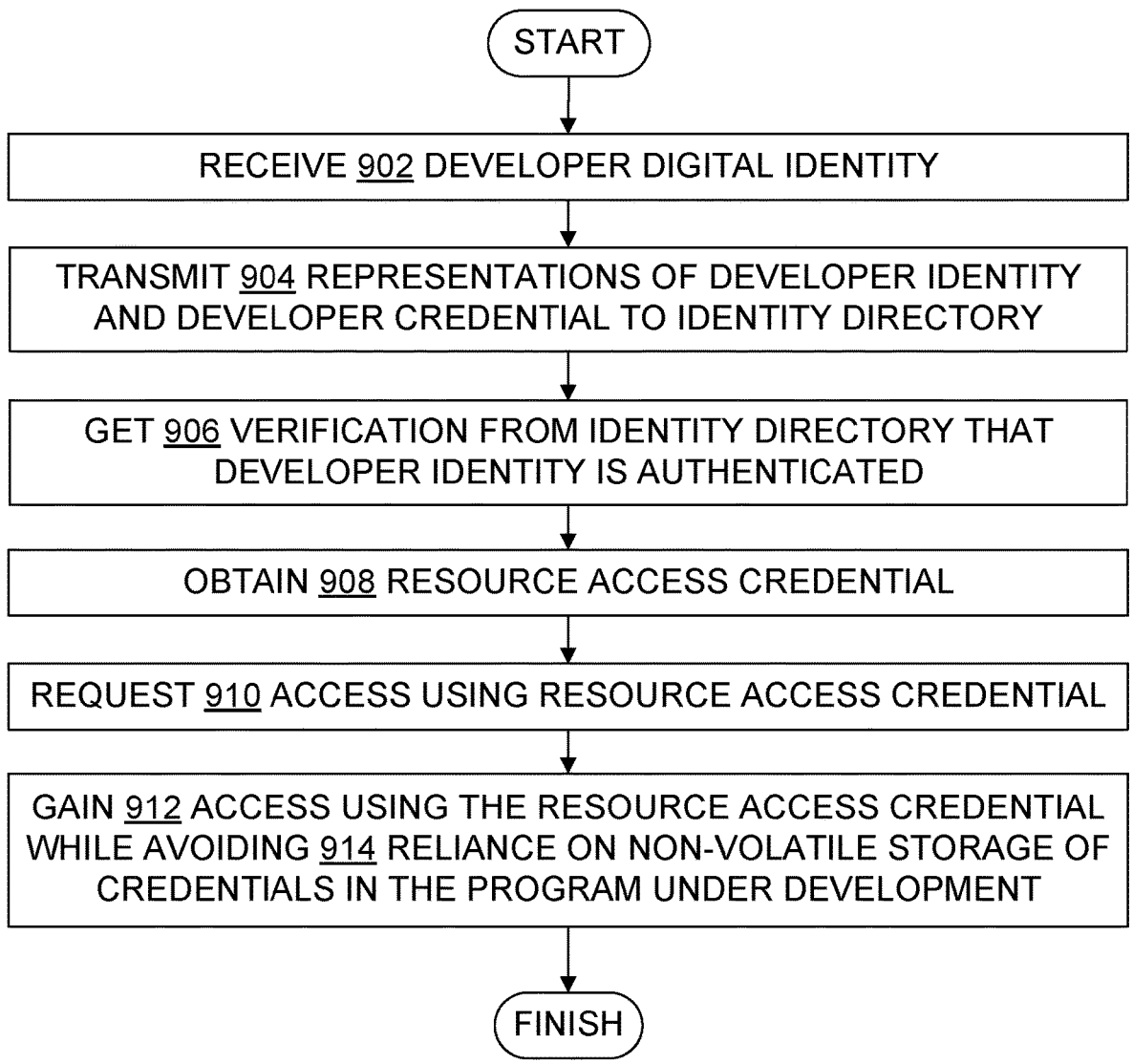
FIG. 9 is a flowchart illustrating some example program authentication methods, suitable for use with various development tools which are appropriately tailored as taught herein.
Figure 10:
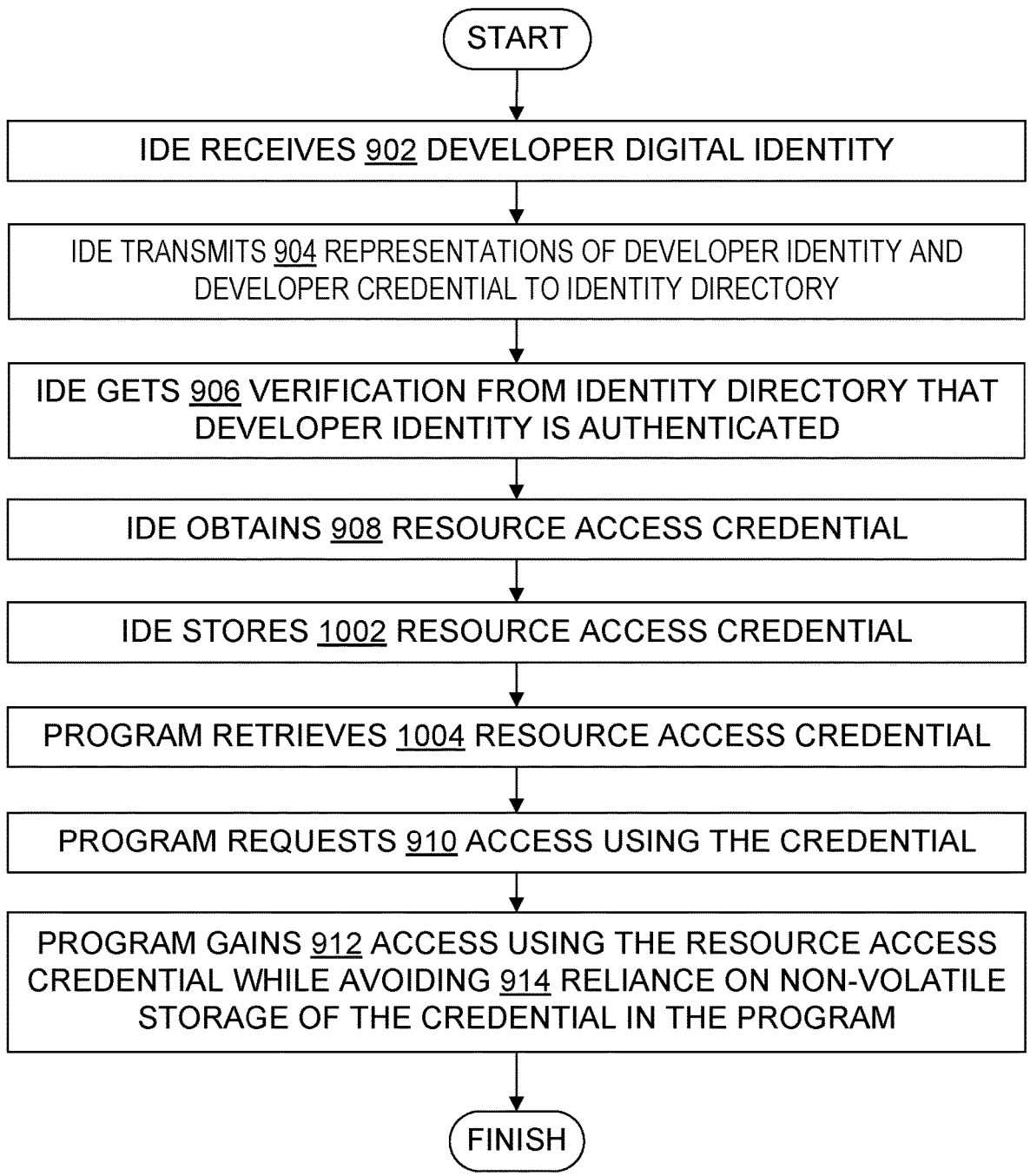
FIG. 10 is a flowchart illustrating some example program authentication methods, similar to the methods of FIG. 9 but with an integrated development environment providing or serving as an appropriately tailored development tool.

With particular reference to FIGS. 9 to 11, some embodiments provide or use a method for program authentication using information shared with a program under development by an IDE or another development tool. The information shared with the program may include, e.g., a developer ID, and a resource access credential obtained under the developer ID.

In some embodiments, a method is performed with a development tool 204 for authenticating a software program for access to a secured resource. This method includes the development tool receiving 902 a developer digital identity and a developer credential, e.g., when the developer logs into the tool. The development tool transmits 904 representations of the developer digital identity and developer credential to an identity management directory 236 (or equivalently, to a service 238 of such as directory 236). The development tool gets 906 a verification from the identity management directory, which verifies that the developer digital identity is authenticated. In other cases, actions that are not part of this particular method occur because the authentication attempt 904 fails, and other steps are taken, e.g., trying a different identity or a different credential. The development tool obtains 908 a resource access credential based on the authenticated developer digital identity.

Continuing the method, a software program is 1104 under development in the development tool. The software program requests 910 access to a secured resource based on the resource access credential. In this way, the software program (which is under development in the development tool) gains 912 access to the secured resource based on the resource access credential, which was obtained based on the developer ID rather than an ID of the program itself. In particular, the software program under development gains 912 access to the secured resource without 914 requiring storage of any secured resource access credentials in source code or configuration files of the software program.

In some embodiments, the development tool receives 902 a developer digital identity by performing at least one of the following sets of steps. In a set of steps denoted here "set A", the development tool displays 1106 a set of account identifiers 608, and the development tool acquires 1108 an account selection which selects an account 602 corresponding to one of the displayed account identifiers. The developer digital identity used to get the access credential corresponds to the selected account 602. In a set of steps denoted here "set T", the development tool displays 1106 a set of tenant identifiers 610 and the development tool acquires 1108 a tenant selection which selects a tenant 606 corresponding to one of the displayed tenant identifiers. The developer digital identity used to get the access credential corresponds to the selected tenant 606. In a set of steps denoted here "set D", the development tool displays 1106 a set of directory service identifiers 612 and the development tool acquires 1108 a directory service selection which selects a directory service 238 (and thus a directory 236) corresponding to one of the displayed directory service identifiers. The developer digital identity used to get the access credential corresponds to the selected directory service 238/selected directory 236.

In other words, in some embodiments, including some using Azure AD, an account may be part of multiple directories/tenants. Resources may give different levels of access depending on which tenant the access token was retrieved for. Some method embodiments not only allow the selection of which developer ID to use but also which tenant/directory to use. As an example of scoped levels of access, rather than requesting access to graph.microsoft.com, a program may request a token 210 that provides UserProfile.ReadAccess. In some embodiments, tenant identifiers 610 recognized by a directory 236 or directory service may be GUIDs, or domain names or user-friendly names associated with a tenant 606. A tenant may be selected 1108 based on a GUID, a domain associated with the tenant, or a user-friendly name of the tenant that is stored in the directory 236. For example, in some cases a Microsoft tenant can be selected based on one of the following references identifying that tenant:
"Guid": "72f988bf-86f1-41af-91ab-2d7cd011db47"
"domainName": "microsoft.com"
"displayName": "Microsoft"

In some embodiments, the software program is 1104 under development in the development tool in that the development tool is performing 1110 at least one of the following software development functions 700 on at least a portion of the software program within an hour of (before or after) the software program requesting 910 access to the secured resource based on the resource access credential: text editing 714, software designing 716, syntax checking 706, source code completing 712, code generating 724, compiling 718, executable building 708, defect detecting 722, debugging 702, provisioning 726, deploying 710, diagnostic performing 704, performance monitoring 720, or performance profiling 728.

In some embodiments, the software program determines 1116 that access to one or more secured resources will not be available based on a digital identity of the software program because the digital identity of the software program cannot be authenticated in an environment which currently contains the software program.

In some embodiments, the software program attempts 1114 unsuccessfully to authenticate the software program to the identity management directory using a digital identity of the software program. Based on that, the software program determines 1112 that it is under development and determines 1116 that therefore access to one or more secured resources will be based on a developer digital identity instead of being based on the software program digital identity. This illustrates one way for the same executable code to run in both a development environment and a production environment. The AppAuthentication library discussed elsewhere herein, for example, tries to perform authentication consistent with FIG. 4 using the Microsoft MSI functionality and the program ID, and when that fails the library proceeds according to FIGS. 9 and 10 by using a developer ID to obtain the desired access credential.

In some embodiments, at least one of the following steps includes communicating 1118 using a lightweight directory access protocol 1120: the development tool transmitting 904 representations of the developer digital identity and developer credential to the identity management directory, the development tool getting 906 the verification from the identity management directory. Thus, communications 226 may include LDAP messages.

In some embodiments, the software program requesting 910 access to a secured resource based on the resource access credential includes sending 1122 the resource access credential to a web application program interface.

In some embodiments, the software program requesting 910 access to a secured resource based on the resource access credential includes sending 1124 the resource access credential to a cloud-hosted management service 240 which provides management of one or more of the following: cryptographic keys, digital certificates, or cryptographic hashes.

In some embodiments, a method is performed with an integrated development environment (IDE) 502 which is or includes a development tool 204, for authenticating a software program for access to a secured resource. This method includes some of the steps discussed above, but performed with the IDE as opposed to a stand-alone development tool. Thus, the IDE receives 902 a developer digital identity and a developer credential; the IDE transmits 904 representations of the developer digital identity and developer credential to an identity management directory; the IDE gets 906 a verification from the identity management directory, which verifies that the developer digital identity is authenticated; and the IDE obtains 908 a resource access credential based on the authenticated developer digital identity. In this example, the IDE stores 1002 the resource access credential in a storage location, and a software program directly or indirectly retrieves 1004 the resource access credential from the storage location. Access credential storage 1002 and retrieval 1004 may also be performed without an IDE, e.g., with a stand-alone development tool. The software program requests 910 access to a cloud-hosted secured resource based on the resource access credential, and gains 912 access to the cloud-hosted secured resource based on the resource access credential. That is, the software program 208 (which is under development) gains access to the cloud-hosted secured resource without 914 requiring storage of any secured resource access credentials in source code or configuration files of the software program. By avoiding storage of credentials in program source code and configuration files, the method improves the security of those credentials.

As to direct or indirect retrieval 1004, in some cases the program itself reads the credential from the storage location (hence, directly retrieves), while in other cases or embodiments it does not. Instead of directly retrieving the credential, the program makes a call to a separate program (in addition to the filesystem or kernel), which gets reads the credential from the storage location.

In some embodiments, different resources are accessed, each with a respective credential. For example, in some embodiments the IDE also obtains 908 a second resource access credential based on the authenticated developer digital identity. The software program likewise requests 910 access to a second cloud-hosted secured resource based on the second resource access credential. Then the software program gains 912 access to the second cloud-hosted secured resource based on the second resource access credential. In this example, the cloud-hosted secured resources 242 require different respective resource access credentials for the software program to gain access to the respective cloud-hosted secured resources. The software program under development gains 912 access to the second cloud-hosted secured resource without 914 requiring storage of any secured resource access credentials in source code or configuration files of the software program.

In some embodiments, the software program requests 910 access to the cloud-hosted secured resource based on the resource access credential during an execution session of the software program. An execution session begins when the program receives control of a processor, and ends when the program has been terminated or has crashed or has reach the end of its normal execution. Suspending execution does not end the execution session. This method further includes the IDE performing 1128 one or more of the following debugging 702 functions 700 on the software program during the execution session: step forward a specified number of one or more steps, step backward a specified number of one or more steps, step into a routine, step out of a routine, set a breakpoint, run until a breakpoint is hit, continue execution after hitting a breakpoint, create a trace of execution of at least a portion of the software program.

In some embodiments, the software program gains 912, 1130 access to the cloud-hosted secured resource without requiring authentication of a digital identity which is specific to the software program.

In some embodiments, the same executable form of the software program gains 912 access to the cloud-hosted secured resource when the software program is under development 1104 in the IDE as when the software program runs 1132 independently of and outside the IDE (e.g., in the production environment).

Technical methods shown in the Figures or otherwise disclosed will be performed automatically, e.g., by the program 208 and IDE 502, unless otherwise indicated. Methods may also be performed in part automatically and in part manually to the extent action by a human administrator or other human person is implicated, e.g., entering a developer identifier (e.g., username) and developer credential (e.g., password) in a development tool for subsequent use in obtaining a resource access credential 210. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 10 and 11. Steps may be performed serially, in a partially overlapping manner, or fully in parallel. In particular, the order in which flowchart 1000 or flowchart 1100 is traversed to indicate the steps performed during a method may vary from one performance of the method to another performance of the method. The flowchart traversal order may also vary from one method embodiment to another method embodiment. Steps may also be omitted, combined, renamed, regrouped, be performed on one or more machines, or otherwise depart from the illustrated flow, provided that the method performed is operable and conforms to at least one claim.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a program authentication code portion 302, tailored IDE 502, representation 228, and credentials 210, in the form of data 118 and instructions 116, read from a removable storage medium 114 and/or another source such as a network connection, to form a configured storage medium. The configured storage medium 112 is capable of causing a computer system to perform technical process steps for allowing program authentication for secured resource access using a developer ID without credential embedment in a program, as disclosed herein. The Figures thus help illustrate configured storage media embodiments and process embodiments, as well as system and process embodiments. In particular, any of the process steps illustrated in FIG. 10 or 11, or otherwise taught herein, may be used to help configure a storage medium to form a configured storage medium embodiment.

A Visual Studio® Example (Mark of Microsoft Corporation)

To further illustrate aspects of teachings presented herein, an example using specific Microsoft products is discussed below. As noted elsewhere, embodiments are not limited to specific products discussed herein, and a discussion using specific products is not necessarily essential to satisfaction of written description, enablement, or other legal requirements.

Microsoft Visual Studio® solutions include an Integrated Development Environment (IDE). A Visual Studio® IDE 502 is used to develop software programs 208, including websites, web apps, web services and mobile apps. A developer 104 can personalize and optimize development experiences in Visual Studio® IDEs if the developer sets a Personalization account 602 after signing in to the IDE. Among other things, the developer can automatically connect to services 238 such as Azure® and Azure® DevOps Services in the IDE without being prompted again for credentials 210 for the same account 602.

When the developer starts a Visual Studio® IDE for the first time, the developer is asked to sign in and provide some basic registration information. The developer can choose a Microsoft account 602, a work account 602, or a school account 602, for example. Unless the developer signs out, the developer is automatically signed in to the Visual Studio® IDE each time thereafter when the Visual Studio® IDE starts up.

A Microsoft Cloud Explorer™ tool 122, amongst other IDE features, uses this account management feature. The Cloud Explorer tool enables the developer to view Azure® resources 242 and resource groups, inspect their properties, and perform diagnostic actions from within the Visual Studio® IDE.

To view the resources associated with an Azure® account, the developer first adds the account to Cloud Explorer. One can use the Visual Studio® account management feature to log in to the Azure® account 602 whose resources 242 one wants to browse. Once logged in to an Azure® account, the subscriptions associated with that account display. After selecting the subscriptions whose resources will be browseable, those subscriptions and resources display in the Cloud Explorer tool.

Some embodiments also uses the Visual Studio® account management feature, but not necessarily to display resource information in the IDE as Cloud Explorer does. Instead, account management is used by a service or application being developed or debugged in the IDE. For example, an application being developed in the IDE can use access tokens from the IDE to call Azure® services. During debugging, in some cases the app 124, 208 being debugged uses the Visual Studio® sign-in identity to access Azure® Key Vault 240. Key Vault returns a secret 210 to the app. Later, when the app is deployed and running in a non-development Azure® environment, the app uses an app identity and MSI to access Key Vault, and Key Vault returns the requested secret 210 to the app.

In other words, during debug, instead of using hard-coded credentials 210 in source files 216, an embodiment uses the Visual Studio® account to obtain a token 210 to call Azure® services such as Azure® Key Vault. A library called the Microsoft.Azure.Services.AppAuthentication library has been implemented. This library enables a service or application to authenticate to Azure® services using the developer's Visual Studio® account 602 during development, and to authenticate as itself (using OAuth 2.0 Client Credentials flow) when deployed to Azure® outside the Visual Studio® context.

Thus, in this example an Azure® service being called authenticates the calling application which is under development and is using the developer's identity. The application under development obtained the developer's identity using the Visual Studio® account management feature. The Azure® service being called returns the appropriate response. This part of the example involves a local development scenario.

When the same application is no longer under development (at least at the moment) and is deployed to the Azure® cloud environment (staging or production), the Microsoft.Azure.Services.AppAuthentication library 302, 304 switches over to using Managed Service Identity (MSI). MSI provides Azure® services with an automatically managed identity in Azure AD. One can use the identity to authenticate to any service that supports Azure® AD authentication, including Key Vault, without embedding any credentials 210 in one's code. The Azure® service authenticates the calling application, which is using its own identity outside the Visual Studio® context, and returns the appropriate response.

This cybersecurity architectural design eliminates any need to store credentials in source files for the local development scenario. The credential used to authenticate to Azure® services is the developer's account or derived from that account using the developer identity that the developer specified when the developer logged into the Visual Studio® IDE. If the developer has logged in using multiple accounts, the developer can choose which account's token to use, using selection code built into the Visual Studio® IDE.

To use this functionality in an application, a developer can add a reference to the Microsoft.Azure.Services.AppAuthentication library to the application. The Microsoft.Azure.Services.AppAuthentication library makes a process call to an executable extension 206 of the Visual Studio® IDE. That extension uses the Visual Studio® APIs to fetch the developer access token. The Microsoft.Azure.Services.AppAuthentication library passes the fetched access token to the calling method. Additional technical details are provided elsewhere herein, including in the following section on "AppAuthentication—Visual Studio® Integration".

AppAuthentication—Visual Studio® Integration

The following technical details are provided to illustrate one of many different possible approaches to implementing teachings presented here. These details are not necessarily required to satisfy written description, enablement, or other legal requirements, although it may be determined that they help do so.

JavaScript Object Notattion (JSON) File Format

Microsoft.Azure.Services.AppAuthentication for .NET™, or a similar library written in Node JS, Python or another language, will invoke an executable to get an access token from a Visual Studio® key chain, using a file at a fixed path (for a given OS user) that specifies what executable to invoke. This file may allow backward and forward compatibility.

The following is one suitable JSON file format. A C# class used to generate this JSON is below.

```
{
    "TokenProviders": [
        {
            "Path":"c:\\path1\\vs.exe",
            "Arguments": [
"--serviceHubConfig",
"\"C:\\Program Files (x86)\\Microsoft Visual Studio\\vsuvscore\\Enterprise\\Common7\\servicehub.config.json\"",
            "arg2"
            ],
            "Preference":1
        },
        {
            "Path":"E:\\path2\\vs.exe",
            "Arguments": [
"--serviceHubConfig",
"\"C:\\Program Files (x86)\\Microsoft Visual Studio\\vsuvscore\\Enterprise\\Common7\\servicehub.config.json\"",
            ],
            "Preference":2
        }
    ]
}
```

The Microsoft.Azure.Services.AppAuthentication library will use this JSON file. A customer application, which may be a Web App, or another project type, that wants to do service-to-Azure-service authentication, will install the library using a NuGet package. The application code, at runtime, will invoke the library to get a token to call an Azure® Service, e.g., Key Vault. The library will try each of its token providers (e.g., MSI, Visual Studio® IDE, Azure® CLI, Windows Authentication) in turn to get a token.

To get a token using a Visual Studio® key chain, the library will try to read the file from a fixed location, e.g., %localappdata%\.IdentityService\AzureServiceAuth\tokenprovider.json.

If the JSON tokenprovider file is not found, the library will throw an exception indicating that the required tooling is not installed. If the file is found, the library will deserialize it and execute each executable listed in the file, in order of preference, to get a token, and will return the first token 210 found. The expected response format is documented below. The arguments listed for that executable will be sent along, followed by --tenant[tenant]--resource [resource] arguments. The tenant argument is optional. When not sent, the default tenant for the account should be used. For instance, for the file above, the following will be executed first: E:\\path2\\vs.exe arg1--tenant[tenant]--resource [resource]. Before executing the file, the library will check if the file exists. If not, it will not execute this vs.exe command. This will take care of uninstallations. If a token cannot be acquired, the library will throw an exception that a token could not be acquired, with exception information returned from the executable. The executable should return error information in the standard error stream.

As to Visual Studio® usage of the file, each Visual Studio® version that is tailored to expose its Key Chain via an executable will check for this file at a fixed path for a given user. If the file is not found, Visual Studio® code will create a new file, else it will append to the existing file. Each tailored Visual Studio® version will write the path to an executable to call to get the token, the arguments to be sent, and the preference.

As an example, the following C# code may be used to create JSON data suitable for use as taught herein:

```
using System.Collections.Generic;
using System.IO;
using Newtonsoft.Json;
namespace ConsoleApplication11
{
  class Program
  {
    static void Main(string[ ] args)
    {
      TokenProviderFile file = new
TokenProviderFile( );
      TokenProvider provider = new TokenProvider
      {
        Path = @"c:\path1\vs.exe",
        Arguments = new List<string > {"arg1", "arg2"},
        Preference = 1
      };
      TokenProvider provider2 = new TokenProvider
      {
        Path = @"E:\path2\vs.exe",
        Arguments = new List<string> { "arg1"},
        Preference = 2
      };
      file.TokenProviders = new List<TokenProvider>
{provider, provider2};
      File.AppendAllText (@"c:\asal\json.txt",
JsonConvert.SerializeObject(file));
    }
  }
  public class TokenProviderFile
  {
    public List<TokenProvider> TokenProviders;
  }
  public class TokenProvider
  {
    public string Path;
    public List<string > Arguments;
    public int Preference;
  }
}
```

In this example, the Microsoft.Azure.Services.AppAuthentication library expects a response from the Visual Studio® code which is consistent with the following format. This format also works for MSI:

```
{
  "access_token": "eyJ0eXAi...",
  "expires_on": "09/14/2017 00:00:00 PM +00:00,"
  "resource": "https://vault.azure.net",
  "token_type": "Bearer"
}
```

In one design, only the access token was returned. In another, Azure® CLI added a get-access-token option, and MSI was implemented. Some options return additional information about the token (specifically the expires_on time). Some approaches align with Azure® CLI and MSI to keep the response format consistent, which may help other similar libraries. In some versions, this format is the response format from Azure® CLI's get-access-token option. Subscription and tenant information is not returned by MSI. In some versions, subscription is specific to Azure® CLI design, and is not related to a given user's access token. In this context, another example response format is consistent with the following:

```
{
  "accessToken": "eyJ0eXAi...",
  "expiresOn": "2017-09-26 17:29:42.954396",
  "subscription": "959ce4d2-5623-468e-9c54-25ecb52c1122",
  "tenant": "7260719e-be38-4ae0-9792-d255fa45c06d",
  "tokenType": "Bearer"
}
```

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

In short, with the benefit of teachings provided herein, resource 242 access credential 210 security is improved by providing authentication tools and techniques which do not rely on embedment of credentials in the source code 216 or configuration files 218 of programs 208 that use the credentials to access secured resources. A program under development in a development tool 204 determines through the operation of authentication code 302 that it is under development and thus that a developer identity 212 is to be used to obtain access credentials, instead of using an identity of the program itself as occurs when the program is not under development. The development tool 204 may be stand-alone, or it may be in an integrated development environment 502, and the development tool 204 may be extensible with extensions 206, or not extensible. The program may be an application 124, a web service 238, or other software, and may be deployed to a cloud 246 or other networked 108 environment 100. Authentication may be based on a selected 1108 developer identity 212 or selected 1108 account 602 or other subscriber data 600.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10 and 11 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A software development system configured for authenticating a software program for access to a secured resource, the system comprising:
   a processor;
   a memory in operable communication with the processor;
   a developer digital identity which has been authenticated;
   a development tool which is executable with the processor under the authenticated developer digital identity; and
   the software program, which is executable with the processor under control or scrutiny by the development tool, the software program including a program authentication portion which upon execution with the processor retrieves a resource access credential which is: (i) usable by the software program to access the secured resource, (ii) based on the authenticated developer digital identity, and (iii) retrieved from a resource access credential source which is external to the following software program constituents: all source code of the software program, all configuration files of the software program, and wherein the software program attempts unsuccessfully to authenticate the software program using a digital identity of the software program, and determines that it is under development and therefore bases access to the secured resource on the developer digital identity instead of on a digital identity of the software program.

2. The software development system of claim 1, wherein the development tool comprises an integrated development environment.

3. The software development system of claim 1, wherein the development tool is extensible by at least one pluggable tool extension.

4. The software development system of claim 1, wherein the software program comprises at least one of the following: a user-facing application, middleware, a web service, a cloud infrastructure component, or an application which has a version deployed in a cloud.

5. The software development system of claim 1, wherein all source code of the software program and all configuration files of the software program are each free of any currently effective resource access credential and are each also free of any hard-coded path which identifies a storage location which contains a currently effective resource access credential.

6. The software development system of claim 1, in combination with the secured resource.

7. The software development system of claim 1, in combination with the resource access credential source.

8. A method, performed with a development tool, for authenticating a software program for access to a secured resource, the method comprising:
the development tool receiving a developer digital identity and a developer credential;
the development tool transmitting representations of the developer digital identity and developer credential to an identity management directory;
the development tool getting a verification from the identity management directory, which verifies that the developer digital identity is authenticated;
the development tool obtaining a resource access credential based on the authenticated developer digital identity;
a software program being under development in the development tool, the software program attempting unsuccessfully to authenticate the software program to the identity management directory using a digital identity of the software program, whereby the software program determines that it is under development and therefore access to one or more secured resources will be based on a developer digital identity instead of being based on the software program digital identity;
the software program requesting access to a particular secured resource based on the resource access credential which is based on the authenticated developer digital identity; and
the software program which is under development in the development tool gaining access to the particular secured resource based on the resource access credential;
whereby the software program under development gains access to the particular secured resource without requiring storage of any secured resource access credentials in source code or configuration files of the software program.

9. The method of claim 8, wherein the development tool receiving a developer digital identity comprises the development tool displaying a set of account identifiers and the development tool acquiring an account selection which selects an account corresponding to one of the displayed account identifiers, wherein the developer digital identity corresponds to the selected account.

10. The method of claim 8, wherein the software program being under development in the development tool comprises the development tool performing at least one of the following software development functions on at least a portion of the software program within an hour of the software program requesting access to the secured resource based on the resource access credential: text editing, software designing, syntax checking, source code completing, code generating, compiling, executable building, defect detecting, debugging, provisioning, deploying, diagnostic performing, performance monitoring, performance profiling.

11. The method of claim 8, further comprising the software program determining that access to one or more secured resources will not be available based on a digital identity of the software program because the digital identity of the software program cannot be authenticated in an environment which currently contains the software program.

12. The method of claim 8, wherein aid receiving comprises at least one of the following: displaying a set of tenant identifiers and acquiring a tenant selection which selects a tenant corresponding to one of the displayed tenant identifiers, wherein the developer digital identity corresponds to the selected tenant, or displaying a set of directory service identifiers and acquiring a directory service selection which selects a directory service corresponding to one of the displayed directory service identifiers, wherein the developer digital identity corresponds to the selected directory service.

13. The method of claim 8, wherein at least one of the following comprises communicating using a lightweight directory access protocol: the development tool transmitting representations of the developer digital identity and developer credential to the identity management directory, the development tool getting the verification from the identity management directory.

14. The method of claim 8, wherein the software program requesting access to a secured resource based on the resource access credential comprises sending the resource access credential to a web application program interface.

15. The method of claim 8, wherein the software program requesting access to a secured resource based on the resource access credential comprises sending the resource access credential to a cloud-hosted management service which provides management of one or more of the following: cryptographic keys, digital certificates, or cryptographic hashes.

16. A method, performed with an integrated development environment (IDE) which is or includes a development tool, for authenticating a software program for access to a secured resource, the method comprising:
the IDE receiving a developer digital identity and a developer credential;
the IDE transmitting representations of the developer digital identity and developer credential to an identity management directory;
the IDE getting a verification from the identity management directory, which verifies that the developer digital identity is authenticated;
the IDE obtaining a resource access credential based on the authenticated developer digital identity;
the IDE storing the resource access credential in a storage location;
a software program being under development in the IDE, the software program attempting unsuccessfully to authenticate the software program to the identity management directory using a digital identity of the software program, whereby the software program determines that it is under development and therefore access to one or more secured resources will be based on a developer digital identity instead of being based on the software program digital identity;
the software program directly or indirectly retrieving the resource access credential from the storage location;
the software program requesting access to a cloud-hosted secured resource based on the resource access credential; and
the software program gaining access to the cloud-hosted secured resource based on the resource access credential;
whereby the software program under development gains access to the cloud-hosted secured resource without requiring storage of any secured resource access credentials in source code or configuration files of the software program.

17. The method of claim 16, further comprising:
the IDE obtaining a second resource access credential based on the authenticated developer digital identity;
the software program requesting access to a second cloud-hosted secured resource based on the second resource access credential; and
the software program gaining access to the second cloud-hosted secured resource based on the second resource access credential, wherein the cloud-hosted secured resources require different respective resource access credentials for the software program to gain access to the respective cloud-hosted secured resources;
whereby the software program under development gains access to the second cloud-hosted secured resource without requiring storage of any secured resource access credentials in source code or configuration files of the software program.

18. The method of claim 16, wherein the software program requests access to the cloud-hosted secured resource based on the resource access credential during an execution session of the software program, and wherein the method further comprises the IDE performing one or more of the following debugging functions on the software program during the execution session: step forward a specified number of one or more steps, step backward a specified number of one or more steps, step into a routine, step out of a routine, set a breakpoint, run until a breakpoint is hit, continue execution after hitting a breakpoint, create a trace of execution of at least a portion of the software program.

19. The method of claim 16, wherein the software program gains access to the cloud-hosted secured resource without requiring authentication of a digital identity which is specific to the software program.

20. The method of claim 16, further comprising the same executable form of the software program gaining access to the cloud-hosted secured resource when the software program is under development in the IDE as when the software program runs independently of and outside the IDE.

* * * * *